(12) United States Patent
Bona et al.

(10) Patent No.: US 6,483,966 B2
(45) Date of Patent: Nov. 19, 2002

(54) SINGLEMODE LIGHTWAVEGUIDE-COUPLING ELEMENT

(75) Inventors: Gian-Luca Bona, Hedingen (CH); Roland W. Germann, Wangen (CH); Bert Jan Offrein, Langnau am Albis (CH); Huub Salemink, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 09/727,845

(22) Filed: Dec. 1, 2000

(65) Prior Publication Data

US 2002/0122630 A1 Sep. 5, 2002

(51) Int. Cl.$^7$ .................................................. G02B 6/26
(52) U.S. Cl. ............................ 385/43; 385/129; 385/39
(58) Field of Search ................................. 385/129–132, 385/39, 43

(56) References Cited

U.S. PATENT DOCUMENTS

| 5,524,165 A |   | 6/1996 | Labeye et al. ............... 385/129 |
| 5,872,883 A | * | 2/1999 | Ohba et al. .................. 385/129 |

FOREIGN PATENT DOCUMENTS

| DE | 31 07 112 A1 | * | 9/1982 | ............. H01P/1/02 |

OTHER PUBLICATIONS

Ladouceur, F. and Labeye, P., A New General Approach to Optical Waveguide Path Design, J. Lightwave Technology, vol. 13 No. 3, Mar. 1995, pp 481–492.*

Kitoh, T., Takato, N., Yasu, M. and Kawachi M., Bending Loss Reduction in Silica–Based Waveguides by Using Lateral Offsets J. Lightwave Technology, vol. 13, No. 4, Apr. 1995, pp 555–562.*

* cited by examiner

*Primary Examiner*—John D. Lee
*Assistant Examiner*—Sarah U Song
(74) *Attorney, Agent, or Firm*—Casey P. August

(57) ABSTRACT

A singlemode lightwaveguide-coupling element is positioned between an initial waveguide section which there has a basic final width ($W_{0f}$) and a final waveguide section which there has a basic initial width ($W_{n+1i}$) which is bigger than the basic final width ($W_{0f}$). The lightwave directions of both waveguide sections are inclined at a predetermined total angle ($\Delta\alpha$) towards each other. Starting from the initial waveguide section, the lightwaveguide element comprises intermediate waveguide sections each of which at its end has a lightwave direction which is inclined towards the lightwave direction at its opposite end at an inclination angle ($\Delta\alpha_v$), such that the sum of all inclination angles equals the predetermined total angle ($\Delta\alpha$).

8 Claims, 3 Drawing Sheets

SINGLEMODE LIGHTWAVEGUIDE-COUPLING ELEMENT

This application claims priority from International Application No. PCT/IB97/00957 filed on Aug. 4, 1997, published in English under PCT Article 21(2) and now abandoned, the teaching of which is incorporated herein by reference.

TECHNICAL FIELD

The invention is related to a singlemode lightwaveguide-coupling element coupling two lightwaveguide sections together which are inclined at an angle towards each other and which have different widths. The different widths usually derive from a different radius of curvature of the lightwaveguides, e.g. a straight section and a bent section which are to be coupled. Another reason for different widths may be a different refractive index steps or contrast in the two lightwaveguides. When it is referred to lightwaveguides also the terms optical waveguides or photonic waveguides are used synonymously.

BACKGROUND OF THE INVENTION

When designing an optical integrated circuit of any type, one is often confronted with the problem of linking two given waveguides in the optical circuitry by a waveguide, e.g. when designing a phased array grating. The paths followed by the waveguides are normally constructed or concatenated from a small family of curves, such as segments of lines, ellipses, circles or sinusoidal curves. For these path types the loss incurred via bending has been calculated in detail and some mask-generating software implements them.

Two types of loss occur when a straight waveguide section is coupled to a bent waveguide section with a constant radius of curvature. The so-called bending or radiation loss is present in the curved waveguide section and is a consequence of the departure from translational invariance in the guiding structure. The so-called transition loss occurs at the coupling position, hence when the path followed by the waveguide section has a discontinuity in its curvature. The bending radius of a straight section being infinite changes to the finite radius of the bent section. The magnitude of transition loss is related to the magnitude of the discontinuity.

Bending loss in a curved waveguide section is due to a radial outwards shift of the modal field profile. The may lead to higher energy dissipation in the cladding in comparison with a straight waveguide section and hence to an increased loss.

Transition loss can be seen as an offset and a shape deformation of the modal field profile which leads to the same effect as described for the bending loss.

U.S. Pat. No. 5,175,785 describes an optical waveguide with reduced bending loss, namely a waveguide which is in principle a multimode waveguide with means for attenuating modes higher than the primary mode, such that the waveguide acts as a virtual monomode waveguide.

In U.S. Pat. No. 5,278,931 it is proposed to use an inner core with a higher refractive index than the outer core as waveguide core for reducing bend loss in a singlemode optical waveguide fiber.

A publication dealing with tapered or curved coupling of waveguide sections with low loss is U.S. Pat. No. 4,787,689. There the refractive index profile is chosen variable in the vicinity of curves or tapers. Means for achieving this are prisms or lenses.

Two other strategies are known for minimization of bending and transition losses:

Widening the bent waveguide section is a way to decrease the bending loss in that it increases the confinement of the mode and thus reduces the leakage. The widening is however restricted in that it should not allow multimode propagation.

Inserting an offset in the curved waveguide section equal to the mode offset created by the bend, is supposed to ensure that the modal field profiles of the straight and the curved waveguide sections are better aligned and hence minimizes transition loss. Introduction of such offsets is discussed in the article "Bending Loss Reduction in Silica-Based Waveguides by Using Lateral Offsets" by Kito, Takato, Yasu and Kawachi in Journal of Lightwave Technology, Vol.13, No.4, April 1995, pp 555–562, and also in Patent DE3107112.

The optical arrangements shown in U.S. Pat. No. 5,243,672 have reduced loss because they comprise a combined widening and offset.

In U.S. Pat. No. 4,993,794 an integrated optic waveguide with a bend is disclosed. This waveguide is supposed to operate with multimode propagation. The waveguide is widened in the region of the bend such that the locus of maximum intensity in the waveguide oscillates from side to side so that the combined wavefront tilts to the left and then to the right. Smooth transitions are recommended to reduce losses.

The article "A New General Approach to Optical Waveguide Path Design" by F. Ladouceur and P. Labeye in Journal of Lightwave Technology, Vol.13, No.3, March 1995, pp 481–492, describes an adapted bending-loss reduction mechanism that relies on a continuous widening of the waveguide together with the reduction of transition loss through curvature adaptation. The motivation of this design lies in the fact that abrupt offset and widening create discontinuities and consequently losses. For transition loss minimization, a progressive bend is proposed which is combined with a widening for reducing bending loss.

OBJECT AND ADVANTAGES OF THE INVENTION

It is an object of the invention to propose a singlemode lightwaveguide-coupling element for connecting two lightwaveguide sections which are inclined at an angle towards each other and which have a different width such that the losses are minimized. The width difference may be depending on a different bend radius and/or a different refractive index contrast.

An alternative design rule for creating this singlemode lightwaveguide-coupling element is disclosed.

With a singlemode lightwaveguide-coupling element according to claim 1, smaller bending radii can be achieved and lesser losses are introduced.

When the singlemode lightwaveguide-coupling element has a rectangular cross-section in the plane of curvature, the manufacturing process is easier and cheaper. Known processes, such as lithographic processes can be used for manufacturing.

When the singlemode lightwaveguide-coupling element has a non-constant bending curve in the plane of curvature and the tangents of adjacent waveguide sections are at least approximately identical, an exacter approach towards the curve of the dependence between waveguide width and bending radius can be achieved, such that the losses are further reduced.

The coupling losses are further reduced when the number of intermediate waveguide sections is chosen such that the approach $\Delta\alpha_i \approx \sin\Delta\alpha_i$ is allowed, because thereby more points of the curve of the dependence between waveguide width and bending radius are used to determine the geometry of the singlemode lightwaveguide-coupling element which leads to an exacter guidance of the lightwaves.

The coupling losses are further reduced when the length ($l_v$) is at least differentiable and decreasing dependent on the final width ($W_{vf}$) Then, the curve reflecting the dependence between waveguide width and bending radius is better approached.

The coupling losses are further reduced when the length ($l_v$) is at least an approach to a logarithmical function of the final width ($W_{vf}$), since experimental data have proven that the logarithmic function represents a very good approach to the curve of the dependence between waveguide width and bending radius.

When the waveguide sections have a different refractive index step, the curve of the dependence between waveguide width and bending radius does not influence the bending radius but directly the length to be chosen according to claim 1. The bending radius can then be chosen as a mathematical help to determine the length of the intermediate waveguide sections.

Of course, also mixed forms of waveguides, incorporating bending as well as a variable refractive index step can be chosen. Then, the determination of the length dependent on the final waveguide width, according claim 1, leads to the desired result.

SUMMARY OF THE INVENTION

For connecting two singlemode waveguide sections which have different waveguide widths, the required widening of the waveguide decreases with increasing bending radius, for achieving a monoinodal and loss-minimized waveguide. The dependence between the radius r and the waveguide width w while is used while the abruptness of radius between the initial waveguide section and the final waveguide section is reduced. In the ideal case, the radius in the intermediate section changes exactly with the function of the dependence between the radius r and the waveguide width w.

When the waveguide width w is increased linearly with propagation distance, the relationship between the waveguide width w and the radius r of curvature leads to a logarithmic change of the bending radius r with the propagation distance in the bend. This fits to the assumption of exponential dependence between the waveguide width w and the bending radius r.

A singlemode lightwaveguide-coupling element is positioned between an initial waveguide section which there has a basic final width in a plane of curvature, and a final waveguide section which there has a basic initial width which is bigger than the basic final width by a width difference. The lightwave directions of both waveguide sections are inclined at a predetermined total angle towards each other.

Starting from the initial waveguide section, the lightwaveguide element comprises intermediate waveguide sections each of which at its end has a lightwave direction which is inclined towards the lightwave direction at its opposite end at an inclination angle, such that the sum of all inclination angles equals the predetermined total angle. Each of the intermediate waveguide sections has an initial width and a final width which is bigger than the initial width by a width difference. For each of the intermediate waveguide sections and for the final waveguide section, its initial width equals the final width of the directly preceding waveguide section. Each of the intermediate waveguide sections further has a length that is constant or steadily decreasing dependent on the final width.

By this geometrical rule, the coupling between the two waveguide sections is following the curve of the dependence between waveguide width and bending radius in that the radius difference or respectively the corresponding refractive index difference is bridged by intermediate waveguide sections with intermediate values of bending radius (or refractive index) while the length of these sections is determined by the dependence between waveguide width and bending radius. The more intermediate waveguide sections, the better the result.

DESCRIPTION OF THE DRAWINGS

Examples of the invention are depicted in the drawings and described in detail below by way of example. It is shown in FIG. 1a: an upside view of a first embodiment comprising a planar waveguide with a 180° bend.

All the figures are for sake of clarity not shown in real dimensions, nor are the relations between the dimensions shown in a realistic scale.

DETAILED DESCRIPTION OF THE INVENTION

In the following, the various exemplary embodiments of the invention are described.

Experimental data shows that there is a relationship between the radius of curvature of a lightwaveguide with a constant bending radius and his width in the plane of curvature. The relation is generally spoken a monotonously falling function. For keeping a good optical efficiency, a bigger radius of curvature requires a smaller width than a smaller radius of curvature. More precisely, the relation can be approached by an exponential function with negative factor, such as $W \sim e^{-r}$. For a lightwaveguide with a constant radius, to change its width, it is necessary that it has different midpoints of the radii and that the outer radius is bigger than the inner radius plus the initial width of the waveguide. Therefore, in the following the optical elements have an inner radius and an outer radius. The above mentioned formula applies to any of the radii. In the optical field, the bending radii are usually big compared to the waveguide width. Therefore, the difference between the outer radius and the inner radius will be small, such that any of them can be chosen for waveguide design. Another possibility is to use an intermediate value between the inner and outer radius.

Figure 1A:
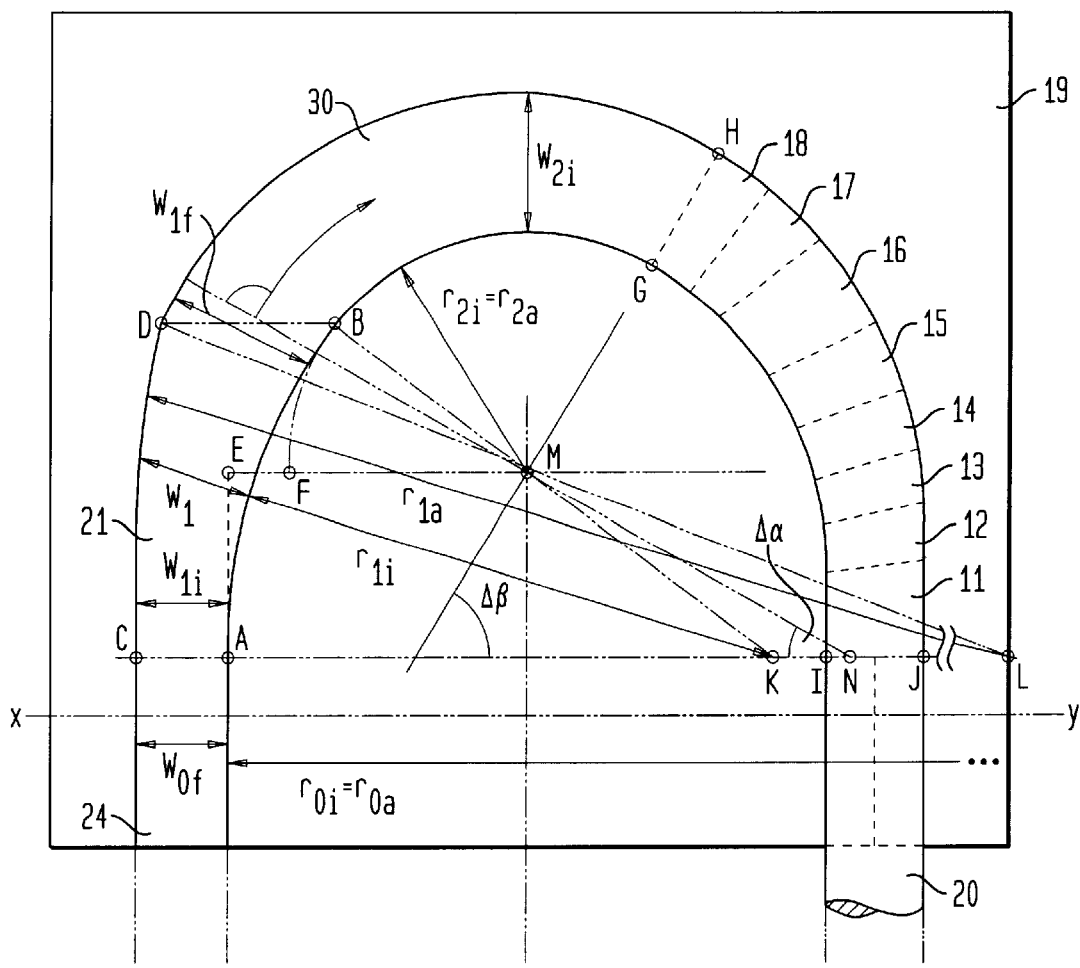
FIG. 1b: a cross-sectional view of said first embodiment
Figure 1B:
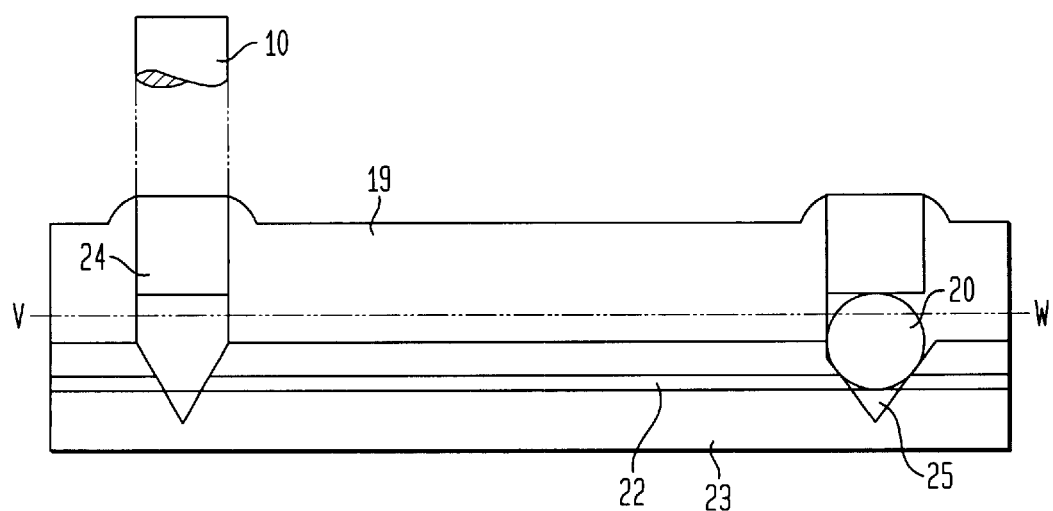

In FIG. 1a an upside view and in FIG. 1b a cross-section of a lightwaveguide arrangement is depicted. It comprises a flat corpus 23 in the shape of a square sheet and made from a material which has a first refractive index $n_1$. Upon the corpus 23 a layer 22 made of a material with a second refractive index $n_2$ is arranged. Starting from an edge of the corpus 23, a first groove 24 and a second groove 25 are arranged in parallel. In the second groove 25, a first fiber end 20 is positioned. The two grooves 24, 25 are connected with each other via a first intermediate waveguide section 21, a central waveguide section 30 with a constant bending radius r, and further intermediate waveguide sections 11, 12, 13, 14, 15, 16, 17, 18. All these waveguide sections 11, 12, 13, 14, 15, 16, 17, 18, 21, 30 are realized in form of stripe-shaped protrusions upon the layer 22 which are made from the same material as the layer 22. Since the two grooves 24, 25 are parallel, the waveguide sections 11, 12, 13, 14, 15, 16, 17, 18, 21, 30 together form a 180° curve in the plane of the upper surface of the corpus 23 which is hereinafter referred to as plane of curvature.

In the first groove 24, another fiber end 10, or more generally, an initial waveguide section 10, is positionable and thereby couplable to the first intermediate waveguide section 21. The initial waveguide section 10 has in the plane of curvature at its end, which end is here delimited by the line connecting a first point A and a second point C, a basic final width $W_{0f}$ which is equal to the initial width $W_{1i}$ of the respective end of the first intermediate waveguide section 21.

The central waveguide section 30 is hereinafter called the final waveguide section 30. It has two ends, one of which is nearer to the first intermediate waveguide section 21 and which is coupled to the first intermediate waveguide section 21. At their coupling position, the final waveguide section 30 has a basic initial width $W_{2i}$, and the first intermediate waveguide section 21 has there a final width $W_{1f}$ which is identical to the basic initial width $W_{2i}$. The basic initial width $W_{2i}$ is bigger than the basic final width $W_{0f}$ by a width difference $\Delta W$.

Furthermore, between the lightwave direction of the initial waveguide section 10 and the lightwave direction of the final waveguide section 30 a total angle $\Delta\alpha$ exists in the plane of curvature.

The first intermediate waveguide section 21 serves for coupling the initial waveguide section 10 to the final waveguide section 30. Since the radius of curvature of the two waveguide sections 10, 30 is different, the width of the first intermediate waveguide section 21 along the way from the initial waveguide section 10 towards the final waveguide section 30 is increasing.

The first intermediate waveguide section 21 at both of its ends couples smoothly to the adjacent waveguide sections 10, 30, which means that on one hand it has the same width as these waveguide sections 10, 30 and on the other hand, the waveguide outlines have almost identical tangents there. The smaller the angle between the tangents the smoother is the coupling.

The initial waveguide section 10 has an initial constant inner radius of curvature $r_{0i}$ and the basic final width is here a constant waveguide width $W_{0f}$ in the plane of curvature. The final waveguide section 30 has a final constant inner radius of curvature $r_{2i}$ and the basic initial width is a second constant waveguide width $W_{2i}$ in the plane of curvature which is bigger than the first constant waveguide width $W_{0f}$. The basic initial width $W_{2i}$ is determined by the final constant inner radius of curvature $r_{2i}$.

The intermediate waveguide section 21 has a constant inner radius of curvature $r_{1i}$ which is smaller than the initial inner radius of curvature $r_{1i}$ and bigger than the final inner radius of curvature $r_{2i}$. The intermediate waveguide section 21 comes to lie between the initial waveguide section 10 and the final waveguide section 30, whereby the waveguide width is increasing from the value of the initial constant waveguide width $W_{0i}$ towards the value of the final constant waveguide width $W_{2i}$, following a constant outer radius of curvature $r_{1a}$.

The central point of curvature for the inner radius of curvature $r_{1i}$ is denoted with K. The central point of curvature for the outer radius of curvature $r_{1a}$ is denoted with L. The total angle $\Delta\alpha$ is the angle between the front facets of on one hand the initial waveguide section 10 and on the other hand the final waveguide section 30. The two face planes cut each other in the point N. The point B is the inner point where the intermediate waveguide section 21 ideally would couple to the final waveguide section 30, since there the radius beam of the inner radius $r_{1i}$ runs through the midpoint M of the inner radius $r_{2i}$. The point D is the outer point where the intermediate waveguide section 21 ideally would couple to the final waveguide section 30, since there the radius beam of the outer radius $r_{1a}$ runs through the midpoint M of the outer radius $r_{2a}$.

The intermediate waveguide section 21 can be seen as ideally delimited by the points A, B, C, D, where it couples smoothly to the adjacent waveguide sections 10, 30. However, it can also be seen as ending at the front face of the final waveguide section 30.

With a broken line through the points E and F is indicated, which would be the coupling solution according to the state of the art.

The length $l_{2I}$ of the first intermediate waveguide section 21 is here defined as the mean length of this section, i.e. the mean value between the length of its inner curve (A-B) and the length of its outer curve (C-D). The value of this length $l_{2I}$ is chosen according to the equation $l_{2I} = C_1 = -C_2 \log (W_{1f} - W_{1i})\Delta\alpha$, wherein $C_1$ is a first constant and $C_2$ is a second constant. This means that the length $l_{2I}$ is steadily decreasing dependent on the final width $W_{1f}$ of the corresponding waveguide section 21 and on the basic initial width $W_{1i}$. The length $l_{2I}$ may also be constant, such as when the product $(W_{1f} - W_{1i})\Delta\alpha$ is constant.

Whereas the intermediate section 21 which connects the initial waveguide section 10 to the central waveguide section 30 represents a one-piece coupling element, the intermediate waveguide sections 11, 12, 13, 14, 15, 16, 17, 18, which connect the central waveguide section 30 to the second fiber end 20, together form a coupling element consisting of these intermediate waveguide sections 11, 12, 13, 14, 15, 16, 17, 18. Every intermediate waveguide section 11, 12, 13, 14, 15, 16, 17, 18 is here a ring piece with a different inner radius and outer radius. The central waveguide section 30 is again the final waveguide section 30 and the second fiber end 20 represents the initial waveguide section 20, such that the width of the initial waveguide section 20 is smaller than the width of the final waveguide section 30.

Each of the eight intermediate waveguide sections 11, 12, 13, 14, 15, 16, 17, 18 at its end which is directed away from the initial waveguide section 20 has a lightwave direction which is inclined towards the lightwave direction at its opposite end at an inclination angle $\Delta\beta_v$, v going from 1 to 8.

The sum of all inclination angles $$\sum_{v=1}^{n} \Delta\beta_v$$

equals the predetermined total angle $\Delta\beta$ between the second fiber end 20 and the central waveguide section 30. Each of the intermediate waveguide sections 11, 12, 13, 14, 15, 16, 17, 18, at its end which is directed towards the directly preceding waveguide section, has an initial width $W_{vi}$.

Each of the waveguide sections 11, 12, 13, 14, 15, 16, 17, 18, further at its opposite end has a final width $W_{vf}$ which is bigger than the initial width $W_{vi}$ by a width difference $\Delta W_v$ which follows the equation $\Delta W_v = \Delta \beta_v (W_{vf} - W_{vi})/\Delta \beta$.

For each of the intermediate waveguide sections 11, 12, 13, 14, 15, 16, 17, 18 and for the final waveguide section 30 its initial width $W_{vi}$ equals the final width $W_{v-1f}$ of the directly preceding waveguide section 11, 12, 13, 14, 15, 16, 17, 18.

Each of the intermediate waveguide sections 11, 12, 13, 14, 15, 16, 17, 18 further has a length $l_v$ that is a steadily decreasing function of the respective final width $W_{vf}$ and of the basic initial width $W_{0i}$.

For sake of clarity, the widths $W_{vi}$, $W_{vf}$, the width differences $\Delta W_v$, the lengths $l_v$ and the inclination angles $\Delta \beta_v$, are not depicted in FIG. 1a.

It becomes clear that the intermediate waveguide sections 11, 12, 13, 14, 15, 16, 17, 18 have the same geometrical relations as has the intermediate waveguide section 21. This is to show that the gap between the two waveguide sections 10, 30, respectively 20, 30 can be bridged with one or more intermediate waveguide sections. The number of intermediate waveguide sections will be a choice taking into account an optimal function and economical aspects. The higher the number of intermediate waveguide sections, the better will be the result but also the higher the design and manufacturing costs.

The arrangement from FIGS. 1a and 1b is one possible approach to an optimal coupling. This approach uses intermediate waveguide sections which all have a constant inner radius and a constant outer radius. Increasing the number of intermediate waveguide sections will lead to a lightwaveguide coupling element that along its longitudinal dimension changes its inner radius and outer radius continuously, following the relation between one of the radii and the width of the lightwaveguide-coupling element. Any approach to this function is suited for realizing the underlying principle. Another approach, using trapezoidal intermediate waveguide sections as approach to this function is explained in the following in the context of FIG. 2.

Figure 2:
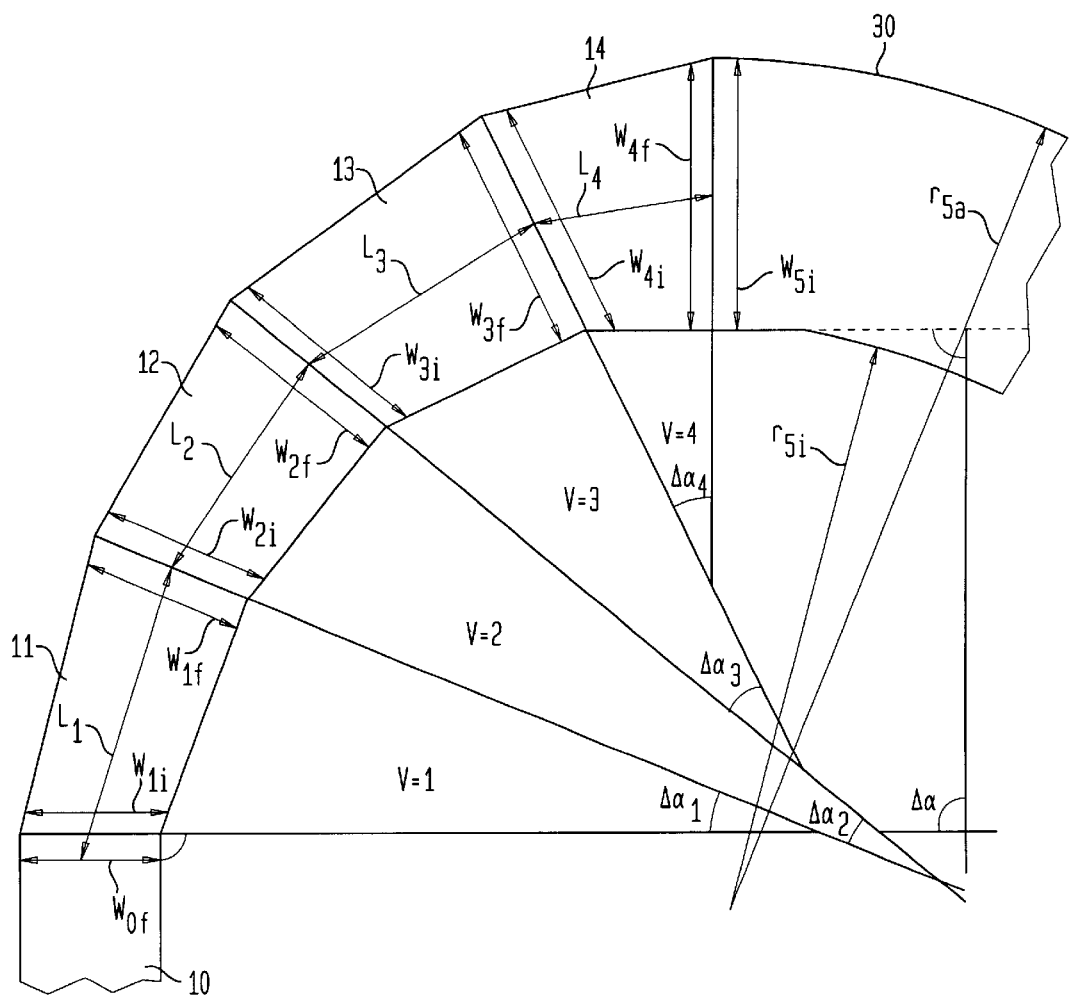
FIG. 2: a second embodiment comprising several trapezoidal intermediate waveguide sections.

In FIG. 2, another arrangement of a curved lightwaveguide is depicted which uses the same numbers for the same elements as in the preceding figures.

Again, an initial waveguide section 10 is connected to a final waveguide section 30 via the intermediate waveguide sections 11, 12, 13, 14. The initial waveguide section 10 has a constant width which hence is also the basic final width $W_{0f}$. The final waveguide section 30 has also a constant width which is bigger than the basic final width $W_{0f}$ and which is the basic initial width $W_{5i}$. The final waveguide section 30 has an inner bending radius $r_{5i}$ and an outer bending radius $r_{5a}$.

Again, the constant width $W_{5i}$ of the final waveguide section 30 depends on the radius of curvature, the inner bending radius $r_{5i}$, respectively the outer bending radius $r_{5a}$. The initial waveguide section 10 has an infinite bending radius.

The lightwave direction of the lightwave which is guided by the initial waveguide section 10 is perpendicular to the end face of the initial waveguide section 10. The same applies to the end face and the respective lightwave direction of the final waveguide section 30. These two lightwave directions are inclined towards each other at a total angle $\Delta \alpha$ in the drawing plane, which is hence the plane of curvature.

The intermediate waveguide sections 11, 12, 13, 14 each have here a rectangular shape which is determined by the initial width $W_{1i}$, $W_{2i}$, $W_{3i}$, $W_{4i}$, the final width $W_{1f}$, $W_{2f}$, $W_{3f}$, $W_{4f}$, the inclination angle $\Delta \alpha_1$, $\Delta \alpha_2$, $\Delta \alpha_3$, $\Delta \alpha_4$ and the length $l_1$, $l_2$, $l_3$, $l_4$. In this example, the end faces of the intermediate waveguide sections 11, 12, 13, 14 are perpendicular to the lightwave direction at these faces.

The first intermediate waveguide section 11 directly adjoins the initial waveguide section 10. At their coupling position, the initial waveguide section 10 and the first intermediate waveguide section 11 have the same width $W_{1i} = W_{0f}$, $W_{1i}$ being the first initial width. The lightwave direction at the end of the first intermediate waveguide section 11 which is farther away from the initial waveguide section 10 is inclined towards the lightwave direction of the initial waveguide section 10 at a first inclination angle $\Delta \alpha_1$. At that end, the first intermediate waveguide section 11 has the first final width $W_{1f}$.

Furthermore, the first final width $W_{1f}$ is bigger than the first initial width $W_{1i}$ by the first width difference $\Delta W_1$, i.e. $W_{1f} - W_{1i} = \Delta W_1$. The first width difference $\Delta W_1$, follows hereby the equation $\Delta W_1 = \Delta \alpha_1 (W_{5i} - W_{0f})/\Delta \alpha$. The first length $l_1$ is here the distance between the midpoints of the faces of the first intermediate waveguide section 11 and is following the equation $l_1 = (C_1 - C_2 \log(W_{1f} - C_3)) \Delta \alpha_1$ for a small first inclination angle $\Delta \alpha_1$.

The second intermediate waveguide section 12 directly adjoins the first intermediate waveguide section 11. At their coupling position, the second intermediate waveguide section 12 and the first intermediate waveguide section 11 have the same width $W_{1f} = W_{2i}$, $W_{2i}$ being the second initial width. The lightwave direction at the end of the second intermediate waveguide section 12 which is farther away from the initial waveguide section 10 is inclined towards the lightwave direction of the first intermediate waveguide section 11 at a second inclination angle $\Delta \alpha_2$. At that end, the second intermediate waveguide section 12 has the second final width $W_{2f}$. Furthermore, the second final width $W_{2f}$ is bigger than the second initial width $W_{2i}$ by the second width difference $\Delta W_2$, i.e. $W_{2f} - W_{2i} = \Delta W_2$. The second width difference $\Delta W_2$, follows hereby the equation $\Delta W_2 = \Delta \alpha_2 (W_{5i} - W_{0f})/\Delta \alpha$. The second length $l_2$ is here the distance between the midpoints of the faces of the second intermediate waveguide section 12 and is following the equation $l_2 = (C_1 - C_2 \log(W_{2f} - C_3)) \Delta \alpha_2$ for a small second inclination angle $\Delta \alpha_2$.

The third intermediate waveguide section 13 directly adjoins the second intermediate waveguide section 12. At their coupling position, the third intermediate waveguide section 13 and the second intermediate waveguide section 12 have the same width $W_{2f} = W_{3i}$, $W_{3i}$ being the third initial width. The lightwave direction at the end of the third intermediate waveguide section 13 which is farer away from the initial waveguide section 10 is inclined towards the lightwave direction of the second intermediate waveguide section 12 at a third inclination angle $\Delta \alpha_3$. At that end, the third intermediate waveguide section 13 has the third final width $W_{3f}$. Furthermore, the third final width $W_{3f}$ is bigger than the third initial width $W_{3i}$ by the third width difference $\Delta W_3$, i.e. $W_{3f} - W_{3i} = \Delta W_3$. The third width difference $\Delta W_3$, follows hereby the equation $\Delta W_3 = \Delta \alpha_3 (W_{5i} - W_{0f})/\Delta \alpha$. The third length $l_3$ is here the distance between the midpoints of the faces of the third intermediate waveguide section 13 and is following the equation $l_3 = (C_1 - C_2 \log(W_{3f} - C_3)) \Delta \alpha_3$ for a small third inclination angle $\Delta \alpha_3$.

The fourth intermediate waveguide section 14 directly adjoins the third intermediate waveguide section 13. At their coupling position, the third intermediate waveguide section 13 and the fourth intermediate waveguide section 14 have the same width $W_{3f} = W_{4i}$, $W_{4i}$ being the fourth initial width. The lightwave direction at the end of the fourth intermediate waveguide section 14 which is farer away from the initial waveguide section 10 is inclined towards the lightwave direction of the third intermediate waveguide section 13 at a fourth inclination angle $\Delta\alpha_4$. At that end, the fourth intermediate waveguide section 14 has the fourth final width $W_{4f}$. Furthermore, the fourth final width $W_{4f}$ is bigger than the fourth initial width $W_{4i}$ by the fourth width difference $\Delta W_4$, i.e. $W_{4f} - W_{4i} = \Delta W_4$. The fourth width difference $\Delta W_4$, follows hereby the equation $\Delta W_4 = \Delta\alpha_4 (W_{5i} - W_{0f})/\Delta\alpha$. The fourth length $l_4$ is here the distance between the midpoints of the faces of the fourth intermediate waveguide section 14 and is following the equation $l_4 = (C_1 - C_2 \log(W_{4f} - C_3))\Delta\alpha_4$ for a small fourth inclination angle $\Delta\alpha_4$.

The final waveguide section 30 finally adjoins the fourth intermediate waveguide section 14. At their coupling position, the fourth intermediate waveguide section 14 and the final waveguide section 30 have the same width $W_{5i} = W_{4f}$.

The inclination angles $\Delta\alpha_1$, $\Delta\alpha_2$, $\Delta\alpha_3$, $\Delta\alpha_4$ sum up to the total angle $\Delta\alpha$. The approach for small inclination angles $\Delta\alpha_1$, $\Delta\alpha_2$, $\Delta\alpha_3$, $\Delta\alpha_4$ will for real conditions become a negligible condition, since a suitable design will automatically be in the range of such small angles. However, to cover the whole range of possible designs, it is to b e added that any monotonously increasing function between the inclination angle $\Delta\alpha_1$, $\Delta\alpha_2$, $\Delta\alpha_3$, $\Delta\alpha_4$; and the length is possible.

With the letters G, H, I and J, the face planes of the final waveguide section 30 and of the first fiber end 20 are denoted.

Function

It has been found that the required widening of the waveguide decreases with increasing bending radius, when a monomodal and loss-minimized waveguide is desired. The invention follows the idea to use the dependence between the radius r and the waveguide width w while reducing the abruptness of radius between the initial waveguide section and the final waveguide section. In the ideal case, the radius in the intermediate section changes exactly with the function of the dependence between the radius r and the waveguide width w.

Since the dependence between the radius r and the waveguide width w is a monotonously falling function, various possible approaches exist to realize a relation between the waveguide width and the bending radius, such as $w = e^{-r}$, $w = \cos kr$, $w = 1/r$, $w = -\log r$ etc.

With the logarithmic dependence, very good experimental results have been achieved.

While already a steady function is sufficient, even better loss-minimization is achievable when following a differentiable function, since the coupling plane tangents then include smaller angles.

The performance is even better, when the thereby achieved taper angle is small enough that coupling to radiation modes is prevented. Then, the fundamental mode from the initial waveguide section couples adiabatically into the fundamental mode in the final waveguide section.

When the waveguide width w is increased linearly with propagation distance, the relationship between the waveguide width w and the radius r of curvature leads to a logarithmic change of the bending radius r with the propagation distance in the bend. Over, e.g. a linear change, this has the advantage that the larger bending radii section is rather short, which strongly decreases the a mount of required space.

When the lightwaveguide-coupling element is seen as a whole, its best function is performed when the waveguide width w increases linearly with the propagation distance of the optical mode and the radius of curvature r decreases with the propagation distance at least approximately logarithmically. This rule can then be applied to any point of the lightwaveguide-coupling element. However, as shown with the examples before, also approaches to the logarithmic function can be chosen. And also any type of geometry can be chosen for the waveguide sections that form together the lightwaveguide-coupling element.

Generalization

This arrangement is one embodiment with four intermediate waveguide sections 11, 12, 13, 14. However, the number of intermediate waveguide sections is not restricted and can be any number n, at least 1. With n intermediate waveguide sections, being counted starting from the initial waveguide section 10 to the last intermediate waveguide section with the number n, for all intermediate waveguide sections the following rules apply:

The intermediate waveguide section with the number v has an inclination angle $\Delta\alpha_v$, an initial width $W_{vi}$, and a final width $W_{vf}$, which is bigger than the initial width $W_{vi}$ by a width difference $\Delta W_v$.

The width difference $\Delta W_v$ is dependent on the inclination angle $\Delta\alpha_v$ in that $\Delta W_v = \Delta\alpha_v (W_{v+1i} - W_{0f})/\alpha$.

The length $l_v$ is steadily decreasing dependent on the final width $W_{vf}$, e.g. $l_v = (C_1 - C_2 \log(W_{vf} - C_3)) \Delta\alpha_v$.

With other words, the length $l_v$ is steadily decreasing dependent on the sum up to this waveguide section of the inclination angles $$\sum_{\gamma=0}^{v} \Delta\alpha_\gamma.$$

The waveguide profile shown and described is only an example. As well, other waveguide profiles can be used, such as buried or ridge waveguides.

The radius decreases with increasing width. This function finds an analogon in nature, when looking at e.g at a Nautilus housing.

Applications which could take most advantage of the invention are devices that comprise bends, such as the directional coupler and the phase shifter. A waveguide-based add-drop component, using cascaded Mach-Zehnder interferometers is such an application. A further example would be a phased-array grating.

Figure 3:
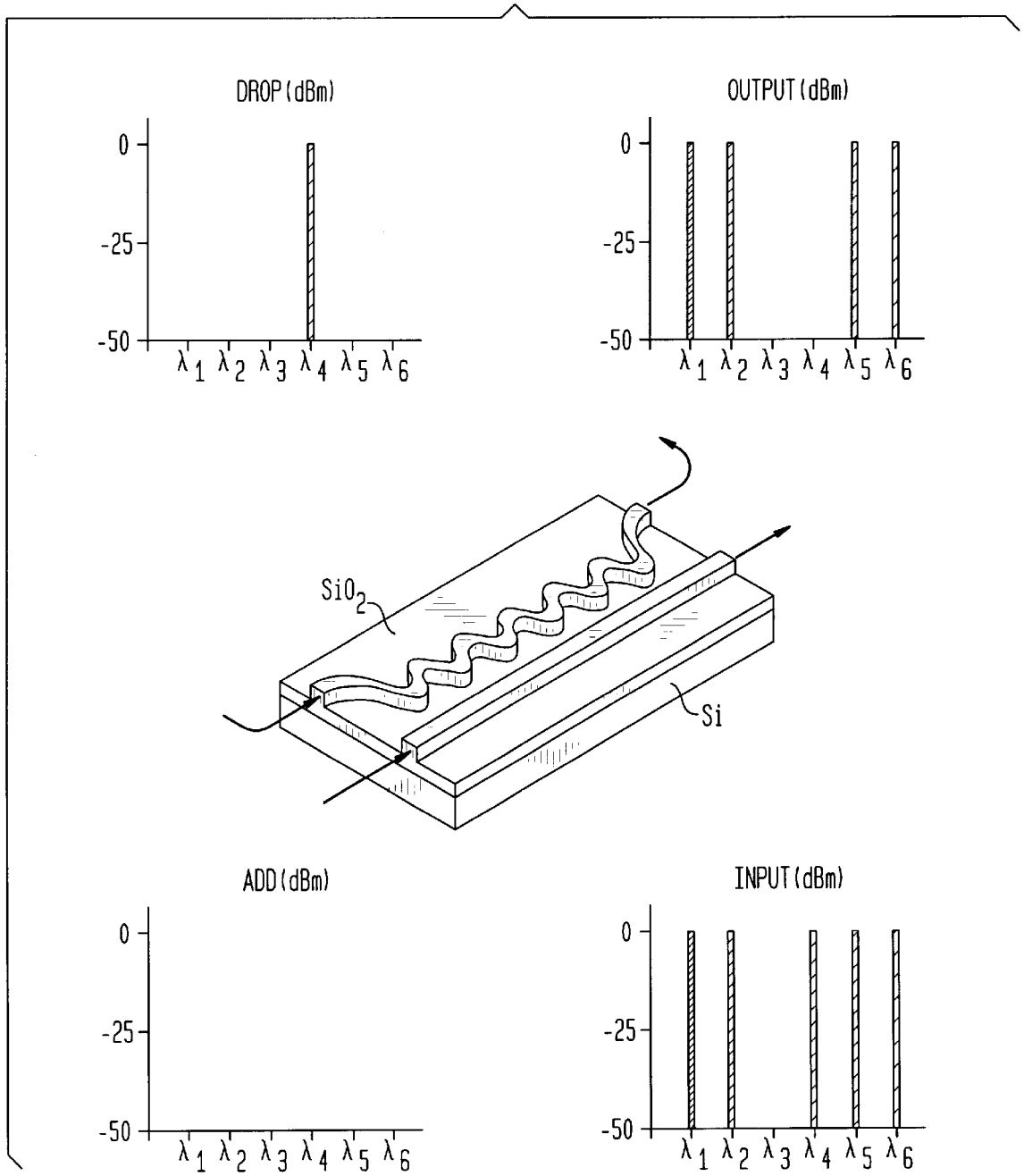
FIG. 3. a waveguide-based add-drop component.

It is depicted in FIG. 3. The shown waveguide-based add-drop component comprises a straight ridge waveguide section along which a ridge waveguide section with a sinusoidal shape is arranged. The ridges are situated upon a layer made of $SiO_2$ and are themselves made of $SiO_2$, while the underlying substrate is made of Si. When e.g. a wavelength multiplex signal with various wavelengths is coupled in to the straight section and no signal is coupled into the sinusoidal section, at the output of the sinusoidal section a selected wavelength can be soupled out while the other wavelengths remain in the straight section and arrive at its outout. In a similar way, an additional wavelength can be added by coupling it in at the input end of the sinusoidal section.

The periodicity of the sinusoidal function is therefor chosen matching with the wavelength to be coupled out.

What is claimed is:

1. Singlemode lightwaveguide-coupling element being with a first end couplable to an end of an initial waveguide section which there has a basic final width ($W_{0f}$) in a plane of curvature, further being couplable with a second end to an end of a final waveguide section which there has a basic initial width ($W_{n+1i}$) in said plane of curvature, said basic initial width ($W_{n+1i}$) being bigger than said basic final width ($W_{0f}$), the lightwave directions of both waveguide sections being inclined at a predetermined total angle ($\Delta\alpha$) towards each other in said plane of curvature, characterized in that starting from said initial waveguide section said lightwaveguide element comprises a number (n) of intermediate waveguide sections, said number (n) being at least 1, that each of said intermediate waveguide sections at its end has a lightwave direction which is inclined towards the lightwave direction at its opposite end at an inclination angle ($\Delta\alpha_v$), such that the sum of all inclination angles $$\left(\sum_{v=1}^{n}\Delta\alpha_v\right)$$

equals the predetermined total angle ($\Delta\alpha$), that each of said intermediate waveguide sections at its end which is directed towards the directly preceding waveguide section, has an initial width ($W_{vi}$), that each of said intermediate waveguide sections further at its opposite end has a final width ($W_{vf}$) which is bigger than said initial width ($W_{vi}$) by a width difference ($\Delta W_v$) which follows the equation $\Delta W_v = \Delta\alpha_v(W_{n+1i} - W_{0f})/\Delta\alpha$, that for each of said intermediate waveguide sections and for said final waveguide section its initial width ($W_{vi}$) equals said final width ($W_{v-1f}$) of the directly preceding waveguide section, and that each of said intermediate waveguide sections further has a length ($l_v$) that is constant or steadily decreasing dependent on said final width ($W_{vf}$).

2. Singlemode lightwaveguide-coupling element according to claim 1, characterized in that it has a rectangular cross-section in said plane of curvature.

3. Singlemode lightwaveguide-coupling element according to claim 1, characterized in that it has a non-constant bending curve in the plane of curvature and that the tangents of adjacent waveguide sections are at least approximately identical.

4. Singlemode lightwaveguide-coupling element according to claim 1 characterized in that said number (n) is chosen such that the approach $\Delta\alpha_i \approx \sin \Delta\alpha_i$ is allowed.

5. Singlemode lightwaveguide-coupling element according to claim 1, characterized in that said length ($l_v$) is at least differentiable and decreasing dependent on said final width ($W_{vf}$).

6. Singlemode lightwaveguide-coupling element according to claim 1, characterized in that the dependence between said length ($l_v$) and said final width ($W_{vf}$) is at least an approach to a logarithmical function.

7. Singlemode lightwaveguide-coupling element according to claim 1, characterized in that the waveguide sections have a different refractive index step.

8. Singlemode lightwaveguide-coupling element according to claim 1, characterized in that its width increases linearly with the propagation distance of the optical mode and the radius of curvature decreases with the propagation distance at least approximately logarithmically.

* * * * *